United States Patent
Khalifa et al.

(10) Patent No.: US 6,526,288 B1
(45) Date of Patent: Feb. 25, 2003

(54) SYSTEM FOR CONNECTING A DATA COMMUNICATION DEVICE OVER WIRELESS TERMINALS TO A COMMUNICATION NETWORK

(75) Inventors: Nabil Khalifa, Le Mans (FR); David J. E. Guyard, Le Mans (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/294,861

(22) Filed: Apr. 20, 1999

(30) Foreign Application Priority Data

Apr. 28, 1998 (EP) .............................................. 98401039

(51) Int. Cl.⁷ .................................................. H04B 1/38
(52) U.S. Cl. ........................................ 455/557; 455/559
(58) Field of Search ................................ 455/422, 550, 455/552, 554, 555, 556, 557, 420, 559; 370/522, 343

(56) References Cited

U.S. PATENT DOCUMENTS

| | | | | |
|---|---|---|---|---|
| 5,353,334 A | | 10/1994 | O'Sullivan ................... 379/59 |
| 5,369,501 A | * | 11/1994 | Wilson et al. .............. 358/407 |
| 5,568,536 A | * | 10/1996 | Tiller et al. ................. 455/557 |
| 5,657,371 A | * | 8/1997 | Suomi et al. ............... 455/418 |
| 5,682,417 A | * | 10/1997 | Nitta .......................... 455/560 |
| 5,726,764 A | * | 3/1998 | Averbuch et al. .......... 358/403 |
| 5,778,205 A | * | 7/1998 | Orimoto ..................... 395/309 |
| 5,781,612 A | * | 7/1998 | Choi et al. .................. 455/557 |
| 5,793,843 A | * | 8/1998 | Morris ........................ 455/422 |
| 5,835,862 A | * | 11/1998 | Nykanen et al. ........... 455/558 |
| 5,844,904 A | * | 12/1998 | Ammar et al. ............. 370/420 |
| 5,870,679 A | * | 2/1999 | Ezumi ......................... 455/557 |
| 5,884,191 A | * | 3/1999 | Karpus et al. .............. 455/557 |
| 5,922,047 A | * | 7/1999 | Newlin et al. .............. 709/217 |
| 6,009,151 A | * | 12/1999 | Staples ..................... 379/90.01 |
| 6,011,579 A | * | 1/2000 | Newlin ........................ 348/15 |
| 6,122,498 A | * | 9/2000 | Sipila ......................... 455/403 |
| 6,125,282 A | * | 9/2000 | Urabe ......................... 455/552 |
| 6,128,510 A | * | 10/2000 | Beukema et al. ........... 455/557 |
| 6,131,136 A | * | 10/2000 | Liebnow et al. ........... 710/131 |
| 6,138,036 A | * | 10/2000 | O'cinneide ................. 455/557 |
| 6,188,884 B1 | * | 2/2001 | Lorieau et al. ............. 455/412 |
| 6,285,890 B1 | * | 9/2001 | Panian ........................ 455/557 |
| 6,295,302 B1 | * | 9/2001 | Hellwig et al. ............. 370/522 |

FOREIGN PATENT DOCUMENTS

| | | | | |
|---|---|---|---|---|
| EP | 0629071 | * | 5/1994 | |
| EP | 0629071 A1 | | 12/1994 | .......... H04M/11/06 |
| WO | WO9107044 | | 5/1991 | .......... H04M/11/00 |

\* cited by examiner

Primary Examiner—Dwayne Bost
Assistant Examiner—Joy K. Contee
(74) Attorney, Agent, or Firm—Dicran Halajian

(57) ABSTRACT

A wireless terminal includes a line interface which is connectable to a modem of an external apparatus. A controller of the wireless terminal is connected to the line interface. In response to connection of the wireless terminal to the modem, the controller switches the wireless terminal from a telephony mode into a transparent transmission mode for transmitting signals received from the modem to a communication network via an air interface.

13 Claims, 4 Drawing Sheets

SYSTEM FOR CONNECTING A DATA COMMUNICATION DEVICE OVER WIRELESS TERMINALS TO A COMMUNICATION NETWORK

FIELD OF THE INVENTION

The present invention relates to a transmission system comprising a data communication device coupled to a first wireless terminal, the wireless terminal being arranged for communicating with a second wireless terminal comprising a network interface for coupling the second wireless terminal to a communications network.

The present invention is also related to wireless terminals for use in such a system.

BACKGROUND OF THE INVENTION

A transmission system according to the preamble is known from U.S. Pat. No. 5,353,334.

Such transmission systems can e.g. be used for connecting personal computers to a telephone network without needing to be in the vicinity of a wired connection to such a telephone network. This is in particular desired for portable computers such as laptops and hand held computers such as the Philips Velo computer. These computers can have integrated or insertable data communication devices such as modems or ISDN terminal adapters for accessing a telephone network. To be able to access the telephone network without needing to be in the vicinity of a wired connection to such a telephone network, a wireless link to said telephone network is necessary.

The above mentioned US patent discloses a wireless phone to which a voice-band modem can be connected. For the connection to the wireless phone a so-called signal processing cable is used which comprises an interface for interfacing the voice band modem to the wireless phone.

For use with this interface, the voice band modem should provide on separate terminals the modulated data signal to be transmitted and digital control information for control purposes such as call set up and dialing. Consequently the data communication device can not be a standard communication device which are available for low prices, but it needs to be a special device dedicated for use with a wireless communication device which are more expensive than the standard communication devices.

SUMMARY OF THE INVENTION

It is an object of the present invention to provide a transmission system according to the preamble in which standard data communication devices can be used.

To achieve said purpose, the transmission system according to the invention is characterized in that the combination of the first wireless terminal and the second wireless are arranged for transparently transmitting signals received from the data communication device to the communications network.

By passing the signals from the data communication device transparently to the communication network, the separate connections for transmitting control information to the (first) wireless terminal can be dispensed with. All control information such as dialing is passed directly to the network. If the data communication device is idle, there will be no connection of the second wireless terminal to the communication network.

If the data communication device goes off-hook, this is signaled by the first wireless terminal to the second wireless terminal, which causes its interface to the communication network also to go off-hook. The information received from the communication network, such as a dial tone is transmitted by the second wireless terminal to the second wireless terminal which passes it unchanged to the communication device. The (analog) dialing signals transmitted by the data communication device are transmitted by the first wireless terminal to the second terminal which passes the dialing signals unmodified to the telephone network.

After a connection has been established, the first and second terminals transmit the information received from the data communication device unchanged to the communication network and vice versa. If the data communication device goes on-hook this condition is also signaled by the first wireless terminal to the second wireless terminal which will caus its interface to network also to go on-hook.

An embodiment of the invention is characterized in that the first wireless terminal and the second wireless terminals comprise telephone terminals, the first wireless terminal comprises detection means for detecting whether there is a data communication device connected to it, and switching means for switching, in case a data communication device is connected to the first wireless terminal, the first wireless terminal and the second terminal from a telephony mode into a transparent transmission mode for transmitting the signals from the data communication device to the communications network.

It is convenient to combine the wireless terminals with a telephone function. In this way a multifunctional device is obtained without a large increase of costs, because the majority of the functions of the wireless terminals are necessary both in the telephony mode and in the transparent transmission mode. The presence of a data communication device is determined by the detection means which control a switching means to set the terminals in transparent transmission mode.

The detection means can be constituted by a switch integrated with a connector for a plug of the data communication device. This switch is activated when a plug of a data communication device is inserted into the connector. It is also possible that the presence of a data communication device is only signalled to be present when it goes off hook.

A further embodiment of the invention is characterized in that the first and second wireless terminals comprise digital transmission means for transmitting digitized voice signals, in that the digital transmission means comprise additional error protecting means, and in that the switching means are arranged for activating the additional error protection means in case a data communication device is connected to the first wireless terminal.

In digital cordless telephone systems such as DECT, the digital channel has in general a Bit Error Rate of $10^{-3}$–$10^{-4}$. In the case the wireless terminals are used in transparent mode, this Bit Error Rate is much too high, because reliable transmission in transparent transmission mode requires a Bit Error Rate smaller than $10^{-6}$. In order to be able to obtain the low Bit Error Rates in the transparent transmission mode using the same transmission medium as in telephony mode, additional error protection means are activated when the wireless terminals are in transparent transmission mode. These additional error protection means can e.g. comprise a rate ⅓ convolutional encoder in the transmitting part of the wireless terminals, and a rate ⅓ convolutional decoder in the receiving part of the wireless terminals.

BRIEF DESCRIPTION OF THE DRAWINGS

The present invention will now be explained with reference to the drawing figures.

DETAILED DESCRIPTION OF THE INVENTION

Figure 1:
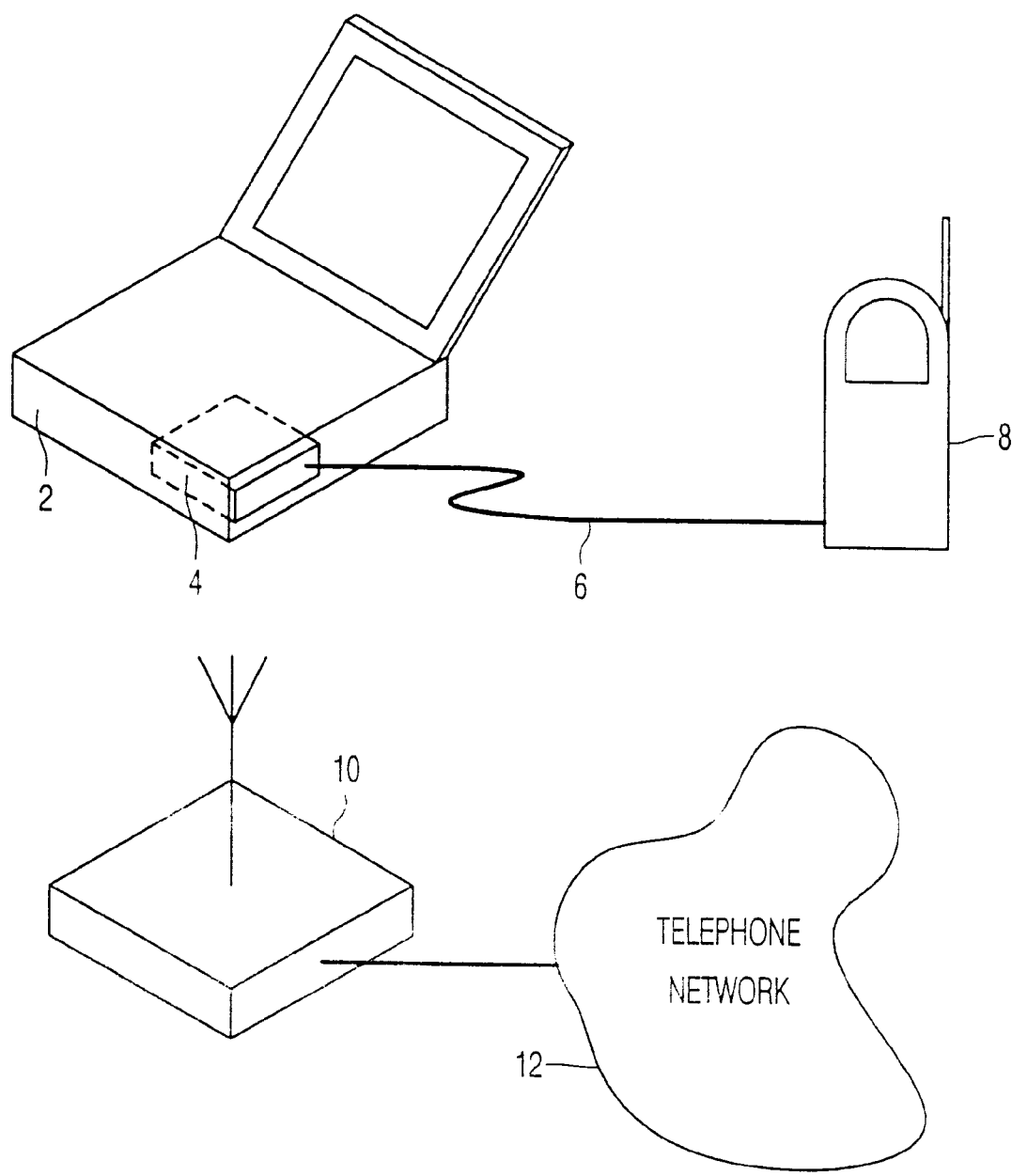
FIG. 1, shows a transmission system according to the invention.

In the transmission system according to FIG. 1, a laptop computer 2 comprises a data communication device, constituted by a PCMCIA card 4 comprising a standard V.34 modem. The input/output of the modem which is suitable for connection to a telephone network is connected to the first wireless terminal 8, which is essentially a modified DECT terminal. The first wireless terminal 8 communicates with the second wireless terminal 10 which is a modified DECT base station. This second terminal 10 is connected to the telephone network 12, which can be an analog telephone network or an ISDN network.

Figure 2:
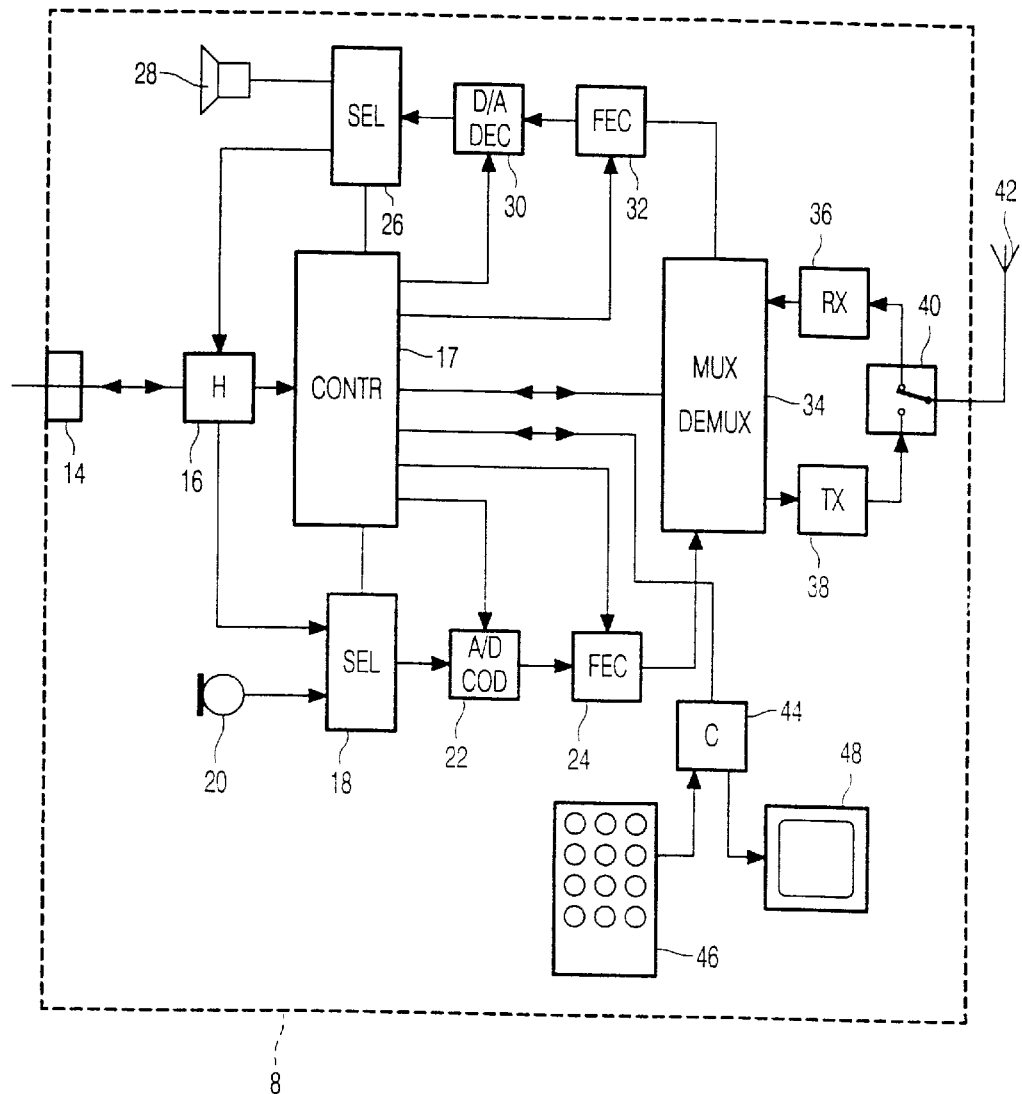
FIG. 2 shows a block diagram of a first wireless terminal to be used in the transmission system according to the invention.

The first terminal according to FIG. 2 comprises a connector 14 for connecting a modem to said first terminal. The connector 14 is preferably of the RJ-11 type, being compliant with standard cables used for connecting modems to a communication network.

The detection means comprising a line interface 16 is arranged for detecting whether there is an (active) data communication device connected to the terminal 8. The line interface 16 signals to the switching means which are comprised in a controller 17 when the line current drawn from the line interface by the modem 4 exceeds a given threshold value.

The controller 17 is arranged for switching the second terminal 8 into the transparent transmission mode when the line interface signals the presence of a data communication device. A control signal indicating the operation mode of the terminal 8 is provided to a selector 18, an A/D converter 22, a channel encoder 24, a multiplexer/demultiplexer 34, a channel decoder 32, a D/A converter 30 and a selector 26.

An output of the line interface 16 is connected to a first input of a selector 18. An output of a microphone 20 is connected to a second input of the selector 18. If the terminal 8 is in telephony mode, the signal from the output of the microphone is passed to the output of the selector, and if the terminal 8 is in transparent transmission mode, the output of the line interface 16 is connected to the output of the selector 18.

The output of the selector 18 is connected to an input of an A/D converter 22. In telephony mode, the A/D converter converts the output signal from the selector 18 into a digital signal and derives an ADPCM encoded signal from the digital signal according to the DECT standard. If the terminal 8 is in transparent transmission mode, the digital signal is not ADPCM encoded, but it is passed unchanged with a resolution of 16 bits to the input of the channel encoder 24.

The channel encoder 24 is only activated in transparent transmission mode. It encodes its input signal using an error correcting code. It is possible that the channel encoder 24 encodes its input signal with the standard CRC code used in DECT P80 packets, but it is also possible that the channel encoder 24 uses a different error correcting code such as a convolutional code with a rate of ⅓. If a convolutional encoder with a rate of ⅓ is used, and the samples of the input signal are transmitted with a resolution of 16 bits, a channel bitrate of 384 kbit/sec is required for each direction. In telephony mode, the channel encoder 24 passes its input signal unchanged to its output.

The output signal of the channel encoder 24 is connected to the multiplexer/demultiplexer 34 which constructs DECT packets from the output signal of the channel encoder 24, and puts these packets in DECT timeslots for transmission to the terminal 10. An output of the multiplexer/demultiplexer 34 is connected to a transmitter 38 which modulates the output signal of the multiplexer/demultiplexer 34 on a carrier.

The output of the transmitter 38 is connected to an input of a duplex switch 40. The duplex switch 40 is arranged for connecting the transmitter 38 during the first 12 time slots in a DECT frame to the antenna 42 and to connect the antenna 42 during the second 12 timeslots in the DECT frame to an input of a receiver 36. This is done because in a DECT frame the first 12 timeslots are used for transmitting data from the terminal 8 to the terminal 10, and the second 12 timeslots are used for transmitting data from the terminal 10 to the terminal 8.

The receiver 36 is arranged for receiving signals transmitted by the terminal 10. The receiver 36 provides its output signal to the multiplexer/demultiplexer 34. The multiplexer/demultiplexer 34 extracts the DECT packets from the timeslots, and passes its output data to the channel decoder 32.

In transparent transmission mode, the channel decoder 32 decodes its input signal and corrects transmission errors, if any, and passes the decoded signal to its output. In telephony mode, the channel decoder 32 is not active and passes its input signal-unchanged to its output. The output of the channel decoder 32 is connected to an input of the D/A converter 30.

In telephony mode, the D/A converter 30 decodes the received ADPCM signal and converts it into an analog signal. In transparent transmission mode, the input signal of the D/A converter 30 is only converted into an analog signal without any further processing being performed.

An output of the D/A converter 30 is connected to the selector 26. In telephony mode, the selector 26 passes its input signal to an earpiece 28 for reproduction of an audible signal. In transparent transmission mode, the selector 26 passes its input signal to an input of the line interface for transmission to the data communication device 4.

The controller 17 is connected to the multiplexer/demultiplexer 34 for transmitting control signals to the terminal 10 and receiving control signals from the terminal 10. A terminal keyboard controller 44 is connected to the controller 17 for transmitting signals from a keyboard 46 and for receiving signals from the controller 17 to a screen 48.

Figure 3:
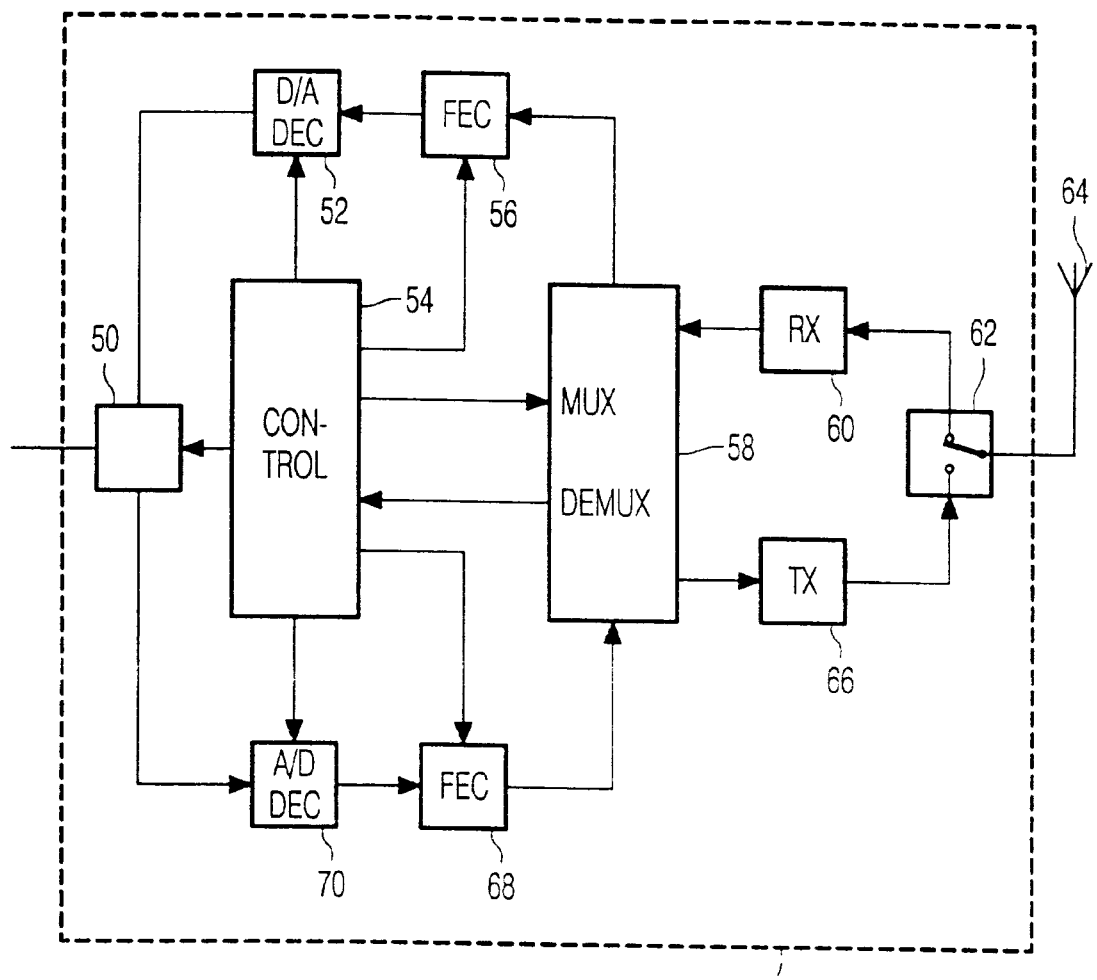
FIG. 3 shows a block diagram of a second wireless terminal to be used in the transmission system according to the invention.

The operation of the terminal 10 according to FIG. 3, is similar to the operation of the terminal 8. The terminal 10 is connected to a telephone network 12 via a line interface 50. An output signal of the line interface 50 is connected via a cascade connection of an A/D converter 70 and a channel encoder 68 to a multiplexer/demultiplexer 58. In telephony mode, the A/D converter 70 converts its input signal to a digital signal and encodes it into an ADPCM signal. In transparent transmission mode, the input signal of the A/D converter 70 is only converted into a digital signal.

In transparent transmission mode, the output signal of the A/D converter 70 is encoded using an error correcting code as explained above. In telephony mode, the input signal of the channel encoder 68 is passed unchanged to its output. The output of the channel encoder 68 is connected to an input of a multiplexer/demultiplexer 58 which constructs DECT packets which are transmitted in DECT timeslots. An output of the multiplexer/demultiplexer 58 is connected to a transmitter 66 which modulated the output signal of the multiplexer/demultiplexer 58 on a carrier. The output of the transmitter 66 is connected to a duplex switch 62. The duplex switch 62 is arranged for connecting the antenna 64 during the first 12 timeslots of a DECT frame to the input of a receiver 60 and for connecting the antenna during the second 12 timeslots of the DECT frame to the output of the transmitter 66. When the output of the transmitter 66 is connected to the antenna 64 signals are transmitted from the terminal 10 to the terminal 8.

When the input of the receiver 60 is connected to the antenna 64 signals are transmitted from the terminal 8 to the terminal 10. The receiver 60 demodulates the signal received from the terminal 8 and passes it to the channel decoder 56. In transparent transmission mode, the channel decoder 56 decodes its input signal and corrects errors when necessary. In telephony mode, the channel decoder 56 passes its input signal unaltered to its output.

The output of the channel decoder 56 is connected to an input of a D/A converter 52. In telephony mode, the D/A converter decodes the received ADPCM signal and converts it into an analog signal. In transparent transmission mode, the D/A converter 52 converts its input signal directly to an analog signal. The output of the D/A converter 52 is connected to an input of the line interface for transmitting the analog signal to the telephone network 12.

If the terminals 8 and 10 are not in use, they are in a standby mode. If a telephone call is initiated from the keyboard of terminal 8 or if an incoming telephone call is received, the terminals operate in telephony mode. In this mode the terminals operate according to the DECT standard. If in the stand by mode it is detected that a data communication device connected to the terminal 8 goes off hook, the terminals are switched into transparent transmission mode.

Figure 4:
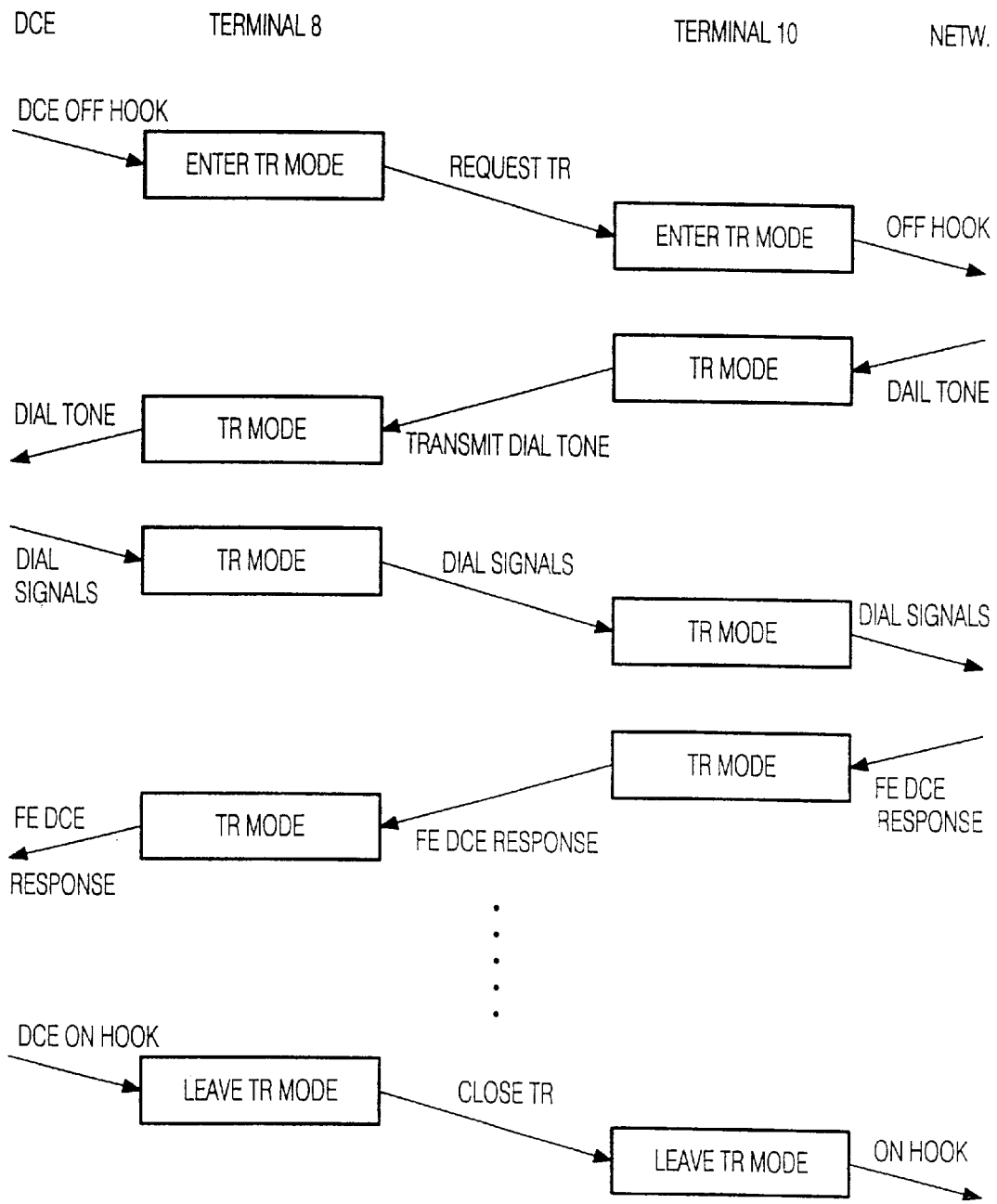
FIG. 4 shows the actions taking place when a call in transparent transmission mode is set up and the actions taking place when the call is terminated.

FIG. 4 shows the actions taking place when setting up a call in transparent transmission mode. The set up of the connection is started when the data communication device 4 goes off hook. This is detected by the line interface 16 of the terminal 8 which informs the controller 17, which switches terminal 8 in transparent transmission mode. Subsequently the terminal 8 seizes a number of time slots required for the transparent connection. Subsequently the terminal 8 transmits a special set up message (REQUEST TR) to the terminal 10. After receiving this special set up message the terminal 10 also switches into transparent transmission mode and causes its interface to the telephone network 12 to go off hook.

If the terminal 10 receives a dial tone from the telephone network, this dial tone is passed via the A/D converter 70, the channel encoder 68, the multiplexer/demultiplexer 58 and the transmitter 66 to the terminal 8. The terminal 8 passes in a similar way the dial tone in a transparent way to the data communication device 4 connected to it.

The dial signals (DTMF tones) issued by the data communication device 4 in response to the reception of the dial tone are passed in a transparent way by the terminal 8 to the terminal 10, which passes them to the network 12. This process of transmitting signals from the telephone network 12 to the data communication device 4 and vice versa is continued until the data communication device 4 goes on hook. When the data communication device 4 goes on hook, it transmits a close message (CLOSE TR) to the terminal 10 and switches to stand by mode. If the terminal 10 received the close message (CLOSE TR), the terminal 10 goes on hook and switches also to standby mode.

For the explanation of the present invention it was assumed that the data communication device 4 was a modem arranged for transmitting and receiving digital signals. It is however perfectly possible to use the present invention with digital data communication devices such as ISDN terminal adapters. If the present invention is used with an ISDN adapter in the terminal 8 according to FIG. 2 the A/D converter 22 should be placed between the microphone 20 and the (now digital) selector 18. Furthermore the D/A converter 30 should be placed between the selector 26 and the earpiece 28.

In the terminal 10 the A/D converter 70 and the D/A converter 52 can be dispensed with. For transmitting ISDN signals at least two timeslots per direction are necessary because each of the timeslots can carry 32kbit/sec of payload data. Dependent on the type of channel coding used, the required number of time slots may increase to 4 or 6 timeslots.

What is claimed is:

1. A transmission system comprising a data communication device coupled by a connector to a first wireless terminal, the first wireless terminal being arranged for communicating with a second wireless terminal, said first and second wireless terminals comprising means for transmitting and receiving digitized signals, said transmission system further comprising:

a network interface for coupling the second wireless terminal to a communications network, the combination of the first wireless terminal and the second wireless terminal being arranged for transparently transmitting digitized signals received from the data communication device to the communications network, and transparently transmitting digitized signals received from the communications network back to the data communication device; and additional error protecting means provided in each first wireless terminal and second wireless terminal for protecting said transmitted digitized signals, said error protecting means being activated only when transparently transmitting digitized signals between said data communication device and said communications network via said first and second wireless terminal, wherein the first wireless terminal and the second wireless terminal comprise telephone terminals, the first wireless terminal comprises detection means for detecting a connection of said data communication device to said first wireless terminal and an off hook condition when said device initiates transparent transmission of digitized signals via said first wireless terminal, and switching means for switching, in response to detection of said connection and said off hook condition, the first wireless terminal and the second wireless terminal from a telephony mode into a transparent transmission mode for respectively enabling transmission of digitized signals from the data communication device to the communications network and for transmission of digitized signals from the communications network to the data communication device.

2. The transmission system according to claim 1, wherein the switching means in said first and second wireless terminals are arranged for activating the additional error protecting means in response to detection of said off hook condition.

3. The transmission system according to claim 1, wherein the second wireless terminal is arranged for transparently transmitting signals received from the communications network via an air interface to the first wireless terminal, and wherein the second wireless terminal is arranged for transparently transmitting signals received from the first wireless terminal via the air interface to the communication network, the first wireless terminal generating a dedicated control message for transmission to said second wireless terminal via said air interface prior to transparent digitized signal transmission in response to detection of an off hook condition, said second wireless terminal further comprising:

detection means for detecting the reception of said dedicated control message from the air interface, and in response to receipt of said control message, said switching means for switching the second wireless terminal from a telephony mode into a transparent transmission mode for transmitting the signals from the air interface to the communications network.

4. The transmission system according to claim 3, wherein the switching means are arranged for activating the additional error protecting means in said second wireless terminal when the dedicated control message is received via the air interface.

5. The transmission system according to claim 1, wherein the detection means includes a line interface which signals to the switching means that said data communication device is connected to the first wireless terminal when a line current drawn from the line Interface by the data communication device exceeds a predetermined threshold.

6. The transmission system according to claim 3, wherein said first wireless terminal further comprises:

a line interface which is connectable to a modem of an external apparatus; a controller connected to said line interface;

wherein, in response to said off hook condition of said modem while said modem is connected to said first wireless terminal, said controller switches said first wireless terminal from said telephony mode into said transparent transmission mode for transmitting signals received from said modem.

7. The transmission system according to claim 6, wherein said line interface signals to said controller to switch said first wireless terminal from said telephony mode into said transparent transmission mode when a line current drawn from said line interface by said modem exceeds a predetermined threshold.

8. The transmission, system of claim 1, wherein said detection means includes a switch integrated with a connector for receiving said data communication device.

9. A transmission system comprising:

a wireless terminal for wireless communication with a network, said wireless terminal being configured to operate in a telephony mode for communicating speech signals, and in a data mode for communicating data signals; and a data communication device configured to be coupled to said wireless terminal for exchanging said data signals with said wireless terminal;

wherein said wireless terminal includes:

a detector which detects presence of said data communication device by detecting a connection of said data communication device to said wireless terminal; and a controller which changes a mode of said wireless terminal to said data mode in response to detection of said presence of said data communication device;

said wireless terminal transparently exchanging said data signals between said data communication device and said network in said data mode, while processing said speech signals in said telephone mode.

10. The transmission system of claim 9, wherein said wireless terminal further comprises error protecting means which are activated only in said data mode.

11. The transmission system of claim 9, wherein said detector includes a switch integrated with a connector for receiving said data communication device.

12. The transmission system of claim 9, wherein said detector detects a line current drawn from the line interface by the data communication device, said controller changing a mode when said line current exceeds a predetermined threshold.

13. The transmission system of claim 9, wherein said a detector detects said presence of said data communication device by detecting an off hook condition of said data communication device.

* * * * *